Feb. 6, 1962   R. PUDELKO   3,020,116
RECORDING ELECTRICITY METERS
Filed Feb. 5, 1957
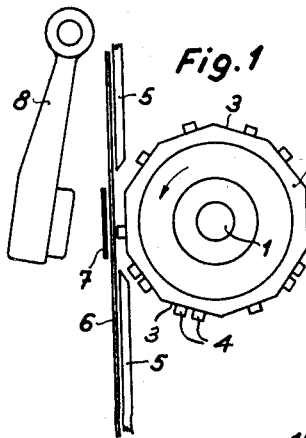
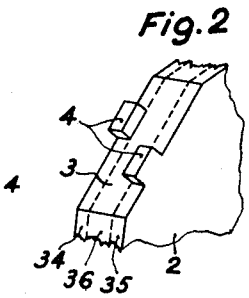
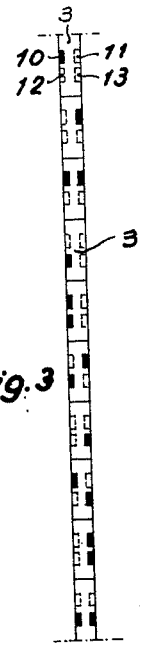
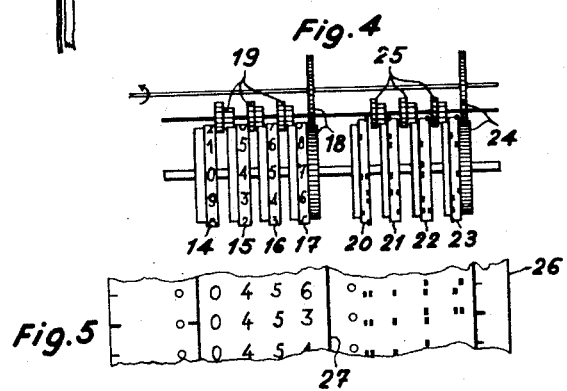
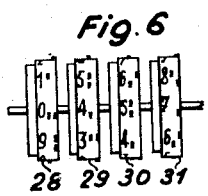
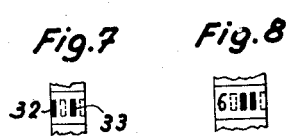
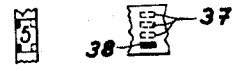
*INVENTOR*
RICHARD PUDELKO
BY
Morgan, Finnegan, Durham & Pine
*ATTORNEYS.*

United States Patent Office

3,020,116
Patented Feb. 6, 1962

3,020,116
RECORDING ELECTRICITY METERS
Richard Pudelko, Zug, Switzerland, assignor to Landis & Gyr A.G., Zug, Switzerland, a body corporate of Switzerland
Filed Feb. 5, 1957, Ser. No. 638,341
Claims priority, application Switzerland Feb. 11, 1956
3 Claims. (Cl. 346—66)

The present invention relates to a novel and improved recording electricity meter in which the measured values are recorded as readily evaluable non-decimal figures at the same time that the values are registered or made visible as decimal figures.

In the measuring of electrical power, the problem has often arisen of ascertaining the total consumption of an installation, such as an electric network which is connected at several points to adjoining networks or power stations. In these cases where this problem is to be solved while avoiding special measuring circuits, there have been provided recording devices which produce punched tapes and which are actuated and controlled by special supply meters. The measured values are then punched automatically on the recording tape at regular periods and the tapes thus produced may be mechanically or electronically evaluated by relatively complex mechanisms at a central point for supervision of the measured installation. From such a perforated tape it is possible to obtain the periodically measured values of the effective and reactive energy consumption and to establish the apparent energy consumption and other values.

Such installations of recording equipment are complex and expensive, not only in their installation, but also in the central equipment which is necessary for the interpretation and totalization of the recorded data, and it is often not possible to obtain the desired data with the requisite degree of accuracy. Such installations have the further disadvantage that the punched records are not susceptible of ready visual interpretation, and it becomes virtually impractical to assemble such records and visually interpret such data so as to obtain a single result from several such records, with the consequent result that such systems have not come into wide use.

Where such values have been recorded as a series of periodically recorded graphically represented values having lines of varying length proportional to the measured values, special means are required to enable the graphical values to be scanned, totalized and interpreted. If the values are recorded as punched holes on the conventional binary system of notation, special tables or equipment are required for their interpretation.

To avoid some of the difficulties connected with systems which record the measured values in a simple binary system, the recording strips have been punched according to a decimal four-digit binary system of notation, which can be visually interpreted after some practice, but which is relatively complex not only with respect to the recording of the values, but also with respect to their interpretation. No less than 16 punch hole positions must be provided for with respect to each four digit number in the recording apparatus. In the sensing or evaluating apparatus, there must be provided suitable means for converting the four-digit binary numbers into decimal numbers, such as apparatus for automatically adjusting a Wheatstone bridge having an outside branch adjusted in accordance with the scanning of the punched holes and in an adjacent outside branch of decade resistor automatically adjusted to correspond to the values of the units of the Wheatstone bridge branch circuit. Additionally, an automatic bridge balance including a polarized pilot relay and at least one control motor and various switching members would normally be required.

The prior attempts to solve the problem all have the disadvantage that at every measuring point there is required some relatively complex, and often unreliable, recording instrument, and the records produced by these instruments must be collected and evaluated at some central point by relatively complex and expensive equipment.

At various points, card perforating machines have previously been mounted to calculate a consumption of electric energy, and these have led to attempts to find a solution to the problem that presented itself. At the measuring points, there were incorporated, in the place of the usual measuring instruments or in addition to these, special measuring instruments in which the recording is effected in several decimal places automatically on strips or cards in such a manner that the latter can be directly evaluated automatically in accordance with the perforated card system. The recording process is, in this case, usually effected by means of the punches of a punching device. Instead of punching holes recording may also be effected by means of other markings, e.g., by the printing of dots. However, as in all cases an immediate automatic recording according to the perforated card system is intended the printed markings are also formed according to that system. Of course, the evaluating arrangements must be equipped with a photo-electric scanning arrangement for the printed strips or cards, instead of with the usual scanning brushes or scanning pins. If the strips or cards in this kind of recording do not have corresponding prints, there is the disadvantage that a reading of the recorded values is hardly practical. A particular disadvantage is presented by the circumstance that the recordings require a comparatively large space on account of the mode of recording which can be evaluated immediately according to the punched card system. If this recording process is based for example on the well-known Hollorith system, only 20 recordings can be made per card in the case of four-place measuring values. In the case of this recording system a special recording device is required at every recording point, which has a very complicated construction and is correspondingly expensive.

It is thus an object of the invention to eliminate the complex and expensive recording devices heretofore employed in combination with consumption meters and the like, and to provide instead a simple modification of the meters themselves whereby they are adapted to directly provide the measured data in suitable form for machine processing.

Another object of the invention is to provide means for modifying the known measuring devices such as wattmeters and the like, whereby said meters are rendered capable of indicating the quantity being measured in conventional form and also in an encoded form adapted to be simply transferred to a record medium.

A still further object of the invention is to provide means in combination with conventional consumption meters and the like which adapts said meters to the recording of the measured quantity in suitable form for processing on a relatively narrow and simply arranged record tape.

An additional object of the invention is to provide an electricity meter with means for recording the data being measured, the modified meter being compact, of simple construction and adapted to record the measured data in non-decimal notation, said meter also being capable of conventional visual interpretation.

A further object of the invention is the provision of an improved recording electricity meter in which the successive, periodically recorded values, of watt hour consumption, maximum demand, power factor or other value, are recorded by impressions made in the usual positions of decimal notation, but are recorded in non-decimal notation, and preferably with each decimal digit being represented by a group of from one to four markings, variously selected, and which are capable of being readily scanned and interpreted either visually or by suitable evaluating mechanism.

Briefly and generally the invention comprises an electricity meter of the type which employs a plurality of rotatably mounted cylindrical registering elements in which each of the elements is modified to serve as a printing member for printing an encoded form of the numerical values indicated on the registering elements.

The accompanying drawings, referred to hereinafter and constituting a part hereof, illustrate various embodiments of the invention and together with the description, serve to explain the principles of the invention.

Of the drawings:

FIGURE 1 shows a side elevation of the printing recording device, in accordance with the invention;

FIGURE 2 is a fragmentary perspective view of a printing member bearing the indicia to be recorded;

FIGURE 3 is a developed view of the surface of the printing member of FIGURES 1 and 2;

FIGURE 4 is a top plan view, somewhat diagrammatic, of a printing mechanism driven according to the decimal system jointly with a special printing mechanism;

FIGURE 5 is a section of a recording strip as produced by the printing recording device of FIGURE 4;

FIGURE 6 is a printing character mechanism according to the decimal system, the symbol carrier of which show next to the printing character the corresponding special indicia;

FIGURE 7 is a modification of the printing character member with four impression positions arranged next to each other;

FIGURE 8 is a modification of the printing character area according to FIGURE 7 but with figures arranged next to the printing character area;

FIGURE 9 is a printing character area with centrally arranged figure; and

FIGURE 10 is a printing character area of a symbol carrier with a vertical axis and places for the printing characters arranged one above the other.

Referring now in detail to the accompanying drawings in which FIGURES 1 to 5 illustrate the present preferred and an illustrative embodiment of the invention, while FIGURES 6 to 10 illustrate modifications of the invention.

FIGURES 1 and 2 show a printing drum 2 which is rotatable on its supporting shaft 1, the drum being driven by a measuring element, such as the metering disc of a watt-hour meter, through conventional reduction gearing (not shown). The periphery of each of the drums 2 is preferably a regular 10-sided prism, being provided with ten equal character fields 3, each of which bears one of the Arabic figures from 0 to 9, and also has the corresponding raised printing characters 4. Several such printing drums 2 are provided on the shaft 1, in closely adjacent coaxial position and are suitably interconnected with transfer mechanism so that the drums are advanced in accordance with the usual advance of a totalizing register. One such drum 2 is provided for each place of the decimal number to be recorded.

In front of the symbol carrying drums 2 is positioned a record strip 6, usually of paper, which is fed intermittently downwardly and is normally held away from the surface of the printing characters 4 by means of the guiding plates 5. In front of the recording strip 6 and extending laterally of it is an inking ribbon 7, which is adapted to be forced towards the printing characters 4 and into forcible contact with the surface of the record strip 6 by means of the printing platen 8, thereby causing the record strip to be printed in accordance with the character 4 presented to it.

FIGURE 2 shows the printing drum 2 with its character field 3 and printing characters 4 in greater detail, the printing characters being arranged within a small rectangular space on the field 3, the two characters 4 shown being arranged at the diagonal corners of the rectangle and providing for two other characters which might be positioned at the other corners of the rectangle. The arrangement of the four printing characters 4 is in accordance with a definite code so that the four characters represent one of the ten decimal digits, and can be easily read after a small amount of practice.

In the developed view of FIGURE 3, the ten characters representing the decimal numbers from 0 to 9 are shown in each of the vertically alined character fields 3. In the upper field, there are shown the four character positions 10, 11, 12 and 13, but a printing character is provided only in the position numbered 10, so as to correspond to the decimal digit "1." The successively lower character fields in FIGURE 3, show the position of the one or two printing characters 4, in their several positions and according to one convenient code system. At the bottom of FIGURE 3, the two printing characters are in the positions 12 and 13 and are used to represent the decimal digit "0," while in the character area immediately above, the two printing characters are in the positions 11 and 13 and are used to represent the decimal digit "9." The code shown is convenient, but other coding arrangements may be used and will preferably comprise the use of two positions only of the four possible positions for each of the ten decimal digits. In the form shown, valences may be assigned to the several positions, as follows:

Position 10=1
Position 11=2
Position 12=4, and
Position 13=7

Thus in the third field from the top, the characters have valences of 1 and 2 which add to be 3, the digit represented. In the next to bottom field, the valences are 7 and 2, which add to equal 9, while the bottom field is anomalous so as to avoid the necessity of using three characters. In this bottom field, the valences of 4 and 7 would add to 11, but as this is greater than 9, it is recognized as standing for the digit "0."

FIGURE 4 shows a typical printing recording device in accordance with the present invention, and in which one of the two usual figure printing mechanisms has been replaced by the printing devices of the present invention. At the left are shown four cylindrical conventional printing drums 14, 15, 16 and 17 of a totalizing recorder which are interconnected by means of the transfer means 19, the drum 17 being driven from the metering means by the gearing 18 in accordance with power consumption, or the other factor being measured. At the right are a series of four printing drums 20, 21, 22 and 23, each like the drums shown in FIGURES 1 and 2, and which are interconnected with the usual tens transfer mechanisms 25, drum 23 being driven by gearing 24 in the same manner as drum 17 is driven.

FIGURE 5 illustrates a typical record made by the recording means of FIGURE 4. The record strip 26 is centrally perforated throughout its length so that its two parts may be separated for machine scanning of the coded half, while the other strip may be used for visual interpretation.

To facilitate the readability of the characters to be printed by the character printing device, the individual drums may be designed in such a manner that they exhibit both the coded printing symbols and the coordinated visual figures. FIGURE 6 shows such a set of drums 28, 29, 30 and 31 which may be substituted for the printing drums 20, 21, 22 and 23 of FIGURE 4, or may form the only printing mechanism of a recording meter.

Instead of having the printing characters arranged to one side of the figure, as in FIGURE 6, the figures may be positioned centrally of the printing character field as shown in FIGURE 9.

The four positions for the printing characters of the field may also be arranged as parallel lines within a small rectangle with increasing valences from left to right, as shown in FIGURE 7, where the printing character 32 represents a value of 1 and the printing character 33 represents a value of 4, giving a value to the combination of 5. Alternatively, the coordinated visual figure can be arranged to one side of the printing character field, as shown in FIGURE 8.

FIGURE 10 shows the form of printing characters which are preferably employed where the printing drums are to be arranged on a vertical shaft, and in this modification, the valence of the several positions may increase from top to bottom or vice versa. In this figure, the positions 37 are blank, while the printing character 38 serves to print an impression which has a value of 7.

The printing drums may be formed in one piece, or may be assembled from two exterior discs 34 and 35 which are mounted, one on either side of a central disc 36 and firmly secured thereto, as shown in FIGURE 2.

The evaluation of the record strips produced by means of the printing recording mechanism described may be effected appropriately by transferring the recorded values to perforated cards by using a simple photoelectric scanning arrangement which, by way of correspondingly controlled feeler lever electromagnets, controls a perforated card-punching arrangement. The cards thus produced may then be evaluated in a purely mechanical manner from any desired points of view. In the case of periodical recordings, the formation of sums or the evaluation of the maximum of the sums can be effected. As other computing operations can also be readily carried out with these machines, the cards, or if it is more appropriate, the perforated control strips, can be made use of in the manner known for accounting purposes, the ascertainment of the apparent consumption, for statistical purposes etc. Thus, in view of the comprehensive possibilities of evaluation, we have all the advantages inherent in the perforation machine processes. In contradistinction to the hitherto known recording and evaluation processes, it is not necessary to install complicated and expensive special recording arrangements at the various measuring points, but already existing recording arrangements can be continued to be used after a simple alteration of their printing arrangement.

The invention in its broader aspects is not limited to the specific mechanisms shown and described but departures may be made therefrom within the scope of the accompanying claims without departing from the principles of the invention and without sacrificing its chief advantages.

What is claimed is:

1. Means for converting electrical measuring meters having conventional Arabic numerical displays for indicating the quantity measured to electrical meters having encoded displays of said indicated quantity for facilitating machine processing of said quantity comprising a code representing counter mechanism adapted to replace the conventional counter mechanism of said meter, said code representing mechanism having a plurality of interconnected cylindrical elements corresponding respectively with successive powers of 10 in a multi-place decimal notation arrangement, each of said cylindrical elements comprising 10 fields on the periphery thereof, each field corresponding with one of the numerals 0 to 9, said fields having projections thereon disposed in the corners of a rectangular area in each of said fields leaving a central space in each said rectangular area which is unoccupied by said projections, the number of said projections and the particular corners from which they project being variable according to the numeral 0 to 9 which is represented by the respective field.

2. Apparatus according to claim 1 in which said fields also include Arabic representations of said numerals 0 to 9.

3. Apparatus according to claim 1 in which said projections are arranged according to a modified binary system in which each of said fields has a maximum of two of said projections.

References Cited in the file of this patent

UNITED STATES PATENTS

| | | |
|---|---|---|
| 2,005,108 | Pudelko | June 18, 1935 |
| 2,050,745 | Woodruff et al. | Aug. 11, 1936 |
| 2,105,291 | Maul | Jan. 11, 1938 |
| 2,347,148 | Chamberlain | Apr. 18, 1944 |
| 2,539,835 | Heynisch | Jan. 30, 1951 |
| 2,554,323 | Cade | May 22, 1951 |
| 2,688,445 | Bowers | Sept. 7, 1954 |

FOREIGN PATENTS

| | | |
|---|---|---|
| 538,016 | Great Britain | July 17, 1941 |